(12) United States Patent
Chang et al.

(10) Patent No.: US 7,591,890 B2
(45) Date of Patent: Sep. 22, 2009

(54) PHOTOCURABLE PIGMENT TYPE INKJET INK COMPOSITION

(75) Inventors: Chi-Jung Chang, Taichung County (TW); Shu-chen Tsou, Hsinchu (TW); Feng-Mei Wu, Hsinchu (TW); Shinn-Jen Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 24 days.

(21) Appl. No.: 11/524,475

(22) Filed: Sep. 21, 2006

(65) Prior Publication Data

US 2007/0015843 A1    Jan. 18, 2007

Related U.S. Application Data

(63) Continuation-in-part of application No. 10/705,943, filed on Nov. 13, 2003, now abandoned.

(30) Foreign Application Priority Data

Dec. 20, 2002   (TW) ............................... 91136927 A

(51) Int. Cl.
*C09D 11/00* (2006.01)
*C09D 11/10* (2006.01)
*C08F 2/50* (2006.01)
*C08J 3/28* (2006.01)

(52) U.S. Cl. ............... 106/31.6; 106/31.13; 106/31.59; 522/71; 522/74; 522/83; 522/81; 522/84; 522/85; 522/86; 522/113; 522/121; 522/120; 522/134; 522/142; 522/181; 523/106; 524/800; 524/802; 524/815; 524/832; 524/836

(58) Field of Classification Search ............... 522/84, 522/85, 86, 74, 81, 113, 121, 120, 134, 142, 522/144, 181, 83, 71; 524/800, 802, 815, 524/832, 836; 106/31.13, 31.59, 31.6; 523/160
See application file for complete search history.

(56) References Cited

U.S. PATENT DOCUMENTS

| | | | |
|---|---|---|---|
| 5,700,862 A * | 12/1997 | Sho et al. | 524/403 |
| 5,952,401 A | 9/1999 | Kimura et al. | |
| 6,326,419 B1 | 12/2001 | Smith et al. | |
| 6,428,862 B1 | 8/2002 | Noguchi et al. | |
| 6,743,514 B1 | 6/2004 | Samaranayake | |
| 6,989,226 B2 * | 1/2006 | Araki et al. | 430/287.1 |
| 2008/0182917 A1 * | 7/2008 | Miyabayashi | 522/71 |

FOREIGN PATENT DOCUMENTS

| | | | |
|---|---|---|---|
| JP | 9-165540 A | | 6/1997 |
| JP | 2001-288386 A | | 10/2001 |
| JP | 2002275403 A | * | 9/2002 |
| TW | 271464 | | 7/1984 |

* cited by examiner

*Primary Examiner*—Sanza L McClendon
(74) *Attorney, Agent, or Firm*—Birch, Stewart, Kolasch & Birch, LLP

(57) ABSTRACT

A photocurable pigment type inkjet ink composition including 5 to 95 wt % of water; 0.5 to 20 wt % of a pigment; 1 to 70 wt % of a photocurable component; and 0.0001 to 30 wt % of a reactive surfactant. The reactive surfactant can serve as a pigment dispersant for dispersing pigment particles or as an emulsifier for emulsifying the photocurable component.

10 Claims, 2 Drawing Sheets
(2 of 2 Drawing Sheet(s) Filed in Color)

PHOTOCURABLE PIGMENT TYPE INKJET INK COMPOSITION

This application is a continuation-in-part of application Ser. No. 10/705,943 filed on Nov. 13, 2003, now abandoned.

BACKGROUND OF THE INVENTION

1. Field of the Invention

The present invention relates to a photocurable pigment type inkjet ink composition, and more particularly to a photocurable pigment type inkjet ink composition including a reactive surfactant.

2. Description of the Related Art

Early inkjet printers used water-based ink that included the water-soluble solvent. The inkjet printing method involves printing a water-based ink onto an ink-absorbent substrate, such as paper or a substrate coated with an ink-receiver layer. The printed image is fixed by penetration, absorption and drying of the ink. Water-based ink suffers from long drying time and it cannot be printed on a non-ink-absorbent substrate such as a glass, plastic, metal, or ceramic substrate. In addition, the printed image has poor water fastness and may partially dissolve upon contact with moisture.

A photo-curable type (ultraviolet-curable type) inkjet ink has been developed to improve the above-mentioned disadvantages. A photo-curable type inkjet ink includes at least a pigment, a dispersant for the pigment, a photocurable (photopolymerizable) component (such as a monomer, resin, or oligomer), an emulsifier for emulsifying the photocurable component, and a photoinitiator that is introduced into the ink by emulsion or dissolution. The photo-curable type inkjet ink is printed onto a substrate and fixed after irradiation (UV ray, IR ray, or electron beam). Thus, a printed image can be fixed on ink-absorbent substrates, and also non-ink-absorbent substrates such as glass, plastic, metal, or ceramic substrates. Thus, the adhesion of the pigment to the substrate, and the water fastness and smear resistance of the image are improved.

Generally, in a pigment type inkjet ink, the average particle size of the pigment is less than 200 nm. Therefore, a suitable dispersant together with milling equipment must be used to turn the pigment particles into microparticles suitable for inkjet printing. The microparticle pigment dispersant solution requires good dispersion stability to prevent nozzle clogging due to pigment agglomeration during printing. In addition, a photocurable component must be blended into the ink by emulsion or dissolution.

Both the dispersant for dispersing the pigment and the emulsifier for emulsifying the photocurable component affect the surface tension and the viscosity of the ink, which in turn affects the inkjet printing properties of the ink.

R.O.C. Patent No. 271464 discloses a dispersant that can dissolve the photocurable resin. Japanese Patent No. 09165540, U.S. Pat. No. 5,952,401, and Japanese Patent No. 2001288386 also disclose non-photocurable dispersants. U.S. Pat. No. 6,326,419 uses a non-photocurable emulsifier for emulsifying a UV-curable monomer or oligomer.

In the above conventional techniques, the dispersants and emulsifiers used in the photocurable inkjet ink are non-photocurable (non-reactive), that is, they cannot react by irradiation. Therefore, the non-reactive dispersant or emulsifier remains in the printed image and acts as a plasticizer. This adversely affects the adhesion of the printed image to the substrate, and the smear resistance of the printed image.

SUMMARY OF THE INVENTION

Therefore, an object of the present invention is to improve the above-mentioned problems and provide a photocurable pigment type inkjet ink composition with good inkjet printing and film forming properties, and good water fastness.

To achieve the above object, the photocurable pigment type inkjet ink composition of the present invention includes 5 to 95 wt % of water; 0.5 to 20 wt % of a pigment; 1 to 70 wt % of a photocurable component; and 0.0001 to 30 wt % of a reactive surfactant, wherein the reactive surfactant comprises a terminal C=C double bond, and can be ionic or non-ionic surfactant. Preferably, the reactive surfactant is present in an amount of 0.5 to 15 wt %.

BRIEF DESCRIPTION OF THE DRAWING

The patent or application file contains at least one drawing executed in color. Copies of this patent or patent application publication with color drawing(s) will be provided by the office upon request and payment of the necessary fee.

DETAILED DESCRIPTION OF THE INVENTION

Figure 1:
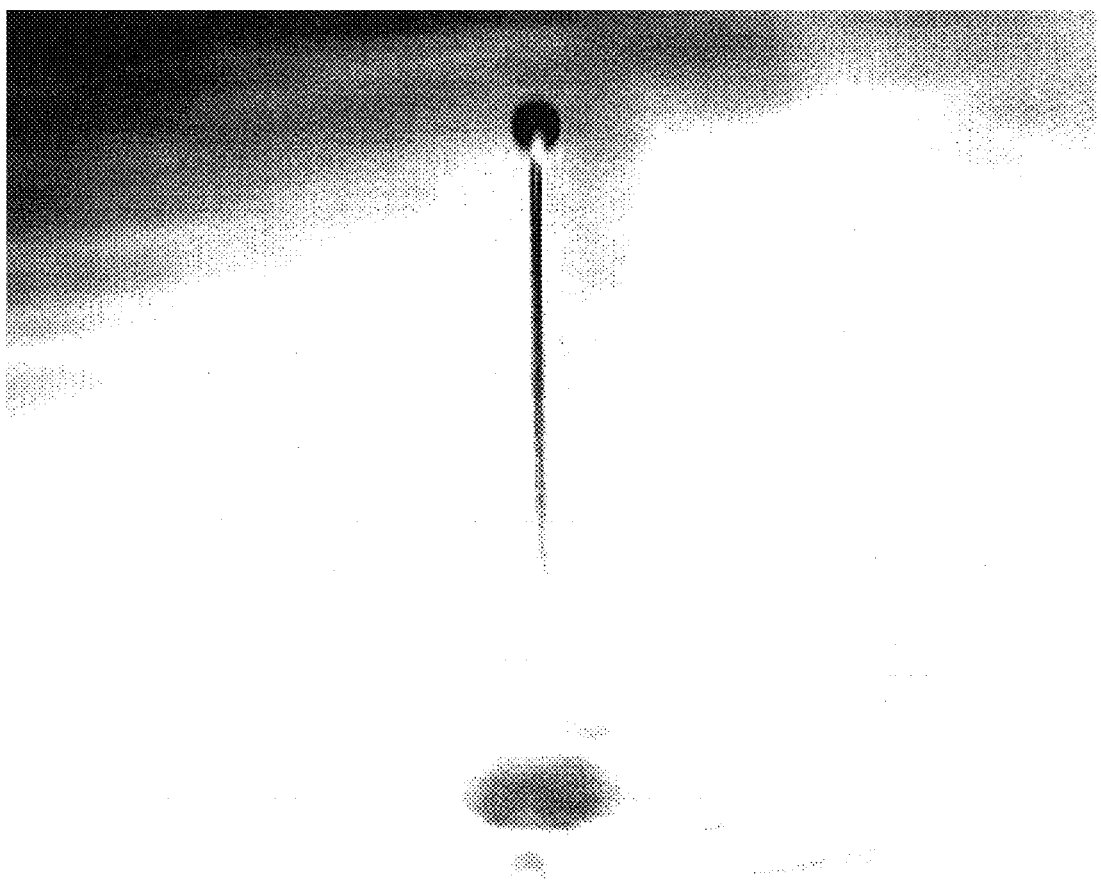
FIG. 1 is a drop formation diagram of the ejected ink droplet of ink prepared from Example 1 of the present invention.

The reactive surfactant of the present invention can be a dispersant for dispersing the pigment particles, or an emulsifier for emulsifying the photocurable component. Specifically, the reactive surfactant comprises a terminal C=C double bond, and can be ionic or non-ionic surfactant. In embodiments of the invention, the reactive surfactant can be preferable acrylic reactive surfactant comprising terminal C=C double bond or derivatives thereof, such as bis(polyoxyethylene polyphenyl ether) methacryl sulfate ammonium, and polyoxyethylene allyl nonylphenol sulfonate.

The feature of the present invention is to use a reactive surfactant to serve as a dispersant for dispersing the pigment particles, or an emulsifier for emulsifying the photocurable component (a monomer, oligomer, or resin). Therefore, during the ink preparation and application processes, the reactive surfactant transforms the pigment into sub-micro or nano particles with good dispersion stability and emulsifies the photocurable component.

In addition to the above components, the photocurable pigment type inkjet ink composition of the present invention can further include 0.05 to 15 wt % of a photoinitiator, preferably in an amount of 0.1 to 10 wt %. At this time, the reactive surfactant can simultaneously emulsify the photocurable component and the photoinitiator.

The reactive surfactant suitable for use in the present invention can be photocurable, for example, one containing a C=C double bond for undergoing free radical polymerization. Preferably, the C=C double bond can be present at a terminal end of molecule chain of the reactive surfactant, for example, at an end group of the main chain or side chain in order to increase reactivity. The reactive surfactant can be ionic or non-ionic surfactant, and suitable non-ionic surfactant for use in the present invention can have a hydrophilic hydrophobic balance (HLB) value of 8 to 16, preferably 12 to 16.

The photocurable pigment type inkjet ink composition of the present invention can have a surface tension of 20 to 65 mN/m, preferably 20 to 40 mN/m.

The photocurable ink of the present invention can be successfully printed on a non-ink-absorbent substrate, such as a glass, plastic, metal, or ceramic substrate. After curing, the printed image has good stability, film-forming property, and water fastness. Moreover, when the ink is inkjet printed and irradiated by UV, the reactive surfactant has reactive functional groups that can participate in the polymerization (photocuring reaction) of other monomers and oligomers. This can increase the preservation and physical properties of the printed image without causing the conventional plasticized side effect due to use of a non-reactive surfactant.

Example 1

Using a Reactive Surfactant as an Emulsifier for the Photocurable Resin and Photoinitiator 33 g of a red pigment (Pigment Red 254), 9.9 g of a non-reactive pigment dispersant (Sinonate 9620P from Sino-Japan Chemical Co. Ltd.), 9.9 g of styrene/acrylic acid block copolymer dispersant (ST/AA=1/1, molecular weight is about 3200), 167.2 g of water, and 644 g of glass milling beads were added and milled for 10 hours. After filtration, a pigment concentrate DBR006 with 8.6% solid content was prepared. The surface tension measured by Kruss K7 was 46.5 mN/m, the viscosity determined by Brook Field DVII was 3.02 cps, and the pigment average particle size determined by Malvern Particle Sizer was 69.7 nanometers.

2-hydroxy-2-methyl-1-phenyl-propan-1-one (photoinitiator, 1.8 weight parts), polyethylene glycol (200) diacrylate (photocurable compound, 20 weight parts), and ethoxylated (9) trimethylolpropane (photocurable compound, 1.5 weight parts) were stirred for 10 minutes. 2-pyrrolidone (co-solvent, 5 weight parts) and anionic reactive surfactant bis(polyoxyethylene polyphenyl ether) methacryl sulfate ammonium (10 weight parts, from Sino-Japan Chemical Co. Ltd.) the composition is bis(polyoxyethylene polyphenyl ether)methacryl sulfate ammonium salt) as an emulsifier were then added and stirred for 10 minutes. 50 weight parts of water was then added and stirred at 5000 rpm for 5 minutes. The reaction mixture was held still until bubbles disappeared. The red pigment concentrate DBRO06 (15 weight parts) was then added and stirred for 15 minutes to obtain a photocurable inkjet ink. The ink had a surface tension of 38 mN/m and a viscosity of 18.4 cps.

The above ink was charged in a HP51626 ink cartridge and printed on a glass with a HP420 inkjet printer. The printed glass was baked at 90° C. for 30 minutes, then at 150° C. for 1 hour, and then irradiated by UV light for 50 seconds. The image could be fixed on the non-ink-absorbent glass.

The jetting speed of the ink was 6 m/s. The drop formation diagram was shown in FIG. 1. Using the reactive surfactant as an emulsifier of the photocurable resin and the photoinitiator, the photocurable inkjet ink exhibits good jetting properties.

A. UV Curing Reactivity:

The printed image on glass was cured by UV and tested by the cross-cut method.

Grade 5: 100% adhesion
Grade 4: 80% adhesion (20% peeling)
Grade 3: 60% adhesion (40% peeling)
Grade 2: 40% adhesion (60% peeling)
Grade 1: 20% adhesion (80% peeling)

B. Water Fastness:

The image was printed on glass and cured by UV. Then the image was immersed in water at 25° C. for 5 minutes, and then tested.

Grade 5: 100% adhesion
Grade 4: 80% adhesion (20% peeling)
Grade 3: 60% adhesion (40% peeling)
Grade 2: 40% adhesion (60% peeling)
Grade 1: 20% adhesion (80% peeling)

The results for UV curing reactivity and water fastness are shown in Table 1.

Example 2

Using a Reactive Surfactant as an Emulsifier for the Photocurable Resin and Photoinitiator 2-hydroxy-2-methyl-1-phenyl-propan-1-one (photoinitiator, 1.8 weight parts), polyethylene glycol (200) diacrylate (photocurable compound, 20 weight parts), and ethoxylated (9) trimethylolpropane (photocurable compound, 1.5 weight parts) were stirred for 10 minutes. 2-pyrrolidone (co-solvent, 5 weight parts) and reactive surfactant polyoxyethylene allyl nonylphenol sulfonate (5 weight parts, from HSIN SOU Chemical Co., Ltd.) as an emulsifier were then added and stirred for 10 minutes. 50 weight parts of water was then added and stirred at 5000 rpm for 5 minutes. The reaction mixture was held still until bubbles disappeared. The red pigment concentrate DBR006 (15 weight parts) prepared from Example 1 was then added and stirred for 15 minutes to obtain a photocurable inkjet ink.

The above ink was charged in a HP51626 ink cartridge and printed on a glass with a HP420 inkjet printer. The printed glass was baked at 90° C. for 30 minutes, then at 150° C. for 1 hour, and then irradiated by UV light for 50 seconds. The image was fixed on the non-ink-absorbent glass.

The test results for UV curing extent and water fastness are shown in Table 1.

Example 3

Using a Reactive Dispersant for Pigment Grinding 27.75 g of a red pigment (Pigment Red 254), 12.3 g of a reactive dispersant bis(polyoxyethylene polyphenyl ether) methacryl sulfate ammonium (from Sino-Japan Chemical Co. Ltd.), 299 g of glass milling beads, and 146 g of water were moistened, milled for 10 hours, and filtered, obtaining a pigment concentrate NDR004 with 11.11% solid content. Physical properties: pH=7.56, viscosity=2.91 cps, surface tension=42.5 mN/m, average particle size=65.4 nanometers.

2-hydroxy-2-methyl-1-phenyl-propan-1-one (photoinitiator, 1.8 weight parts), polyethylene glycol (200) diacrylate (photocurable compound, 20 weight parts), and ethoxylated (9) trimethylolpropane (photocurable compound, 1.5 weight parts) were stirred for 10 minutes. A non-reactive emulsifier and 2-pyrrolidone (co-solvent, 5 weight parts) were then added and stirred for 10 minutes. 50 weight parts of water was then added and stirred at 5000 rpm for 5 minutes. The reaction mixture was held still until bubbles disappeared. The pigment concentrate NDR004 containing the reactive dispersant (15 weight parts) was then added and stirred for 5 minutes to obtain a photocurable inkjet ink. Surface tension=44 mN/m, viscosity=14.7 cps.

The above ink was charged in a HP51626 ink cartridge and printed on a glass with a HP420 inkjet printer. The printed image was baked at 90° C. for 30 minutes, then at 150° C. for 1 hour, and irradiated by UV light for 45 seconds. The image was fixed on the non-ink-absorbent glass.

Figure 2:
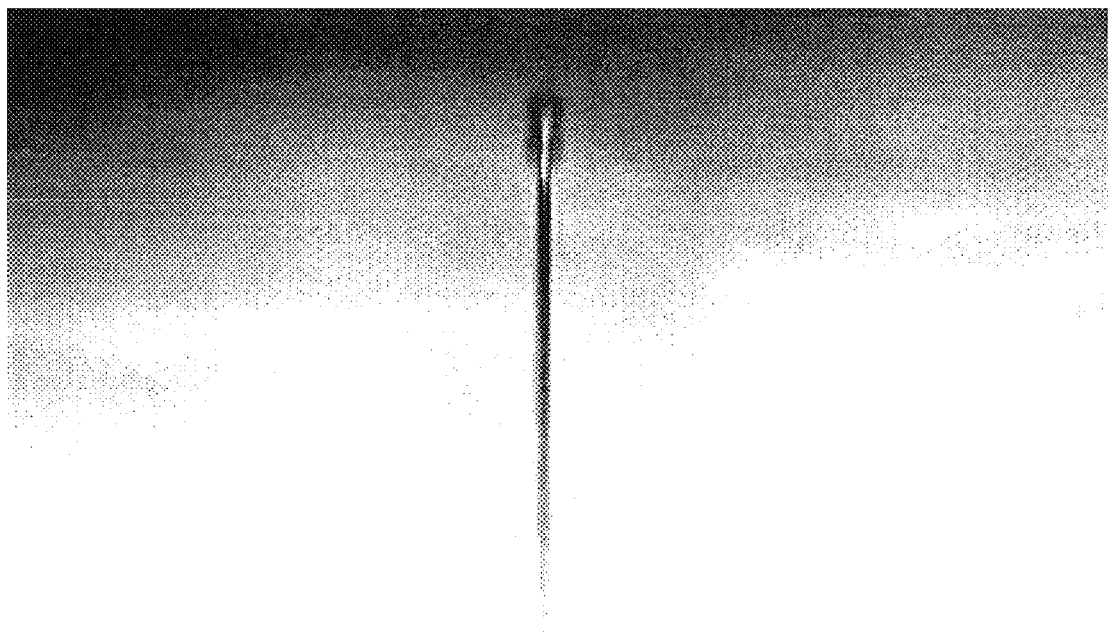
FIG. 2 is a drop formation diagram of the ejected ink droplet of ink prepared from Example 3 of the present invention.

The jetting speed of the ink was 10 m/s. The drop formation diagram was shown in FIG. 2. Using the reactive dispersant to mill the pigment, the photocurable inkjet ink exhibits good jetting properties.

The test results for UV curing reactivity and water fastness are shown in Table 1.

Comparative Example 1

Using a Non-reactive Surfactant as an emulsifier for Photocurable Resin and Photoinitiator 2-hydroxy-2-methyl-1-phenyl-propan-1-one (photoinitiator, 1.8 weight parts), polyethylene glycol (200) diacrylate (photocurable compound, 20 weight parts), and ethoxylated (9) trimethylolpropane (photocurable compound, 1.5 weight parts) were stirred for 10 minutes. 2-pyrrolidone (co-solvent, 5 weight parts) and sodium dodecylbenzenesulfonate (non-reactive surfactant as an emulsifier, 20 weight parts) were added and stirred for 10 minutes. 50 weight parts of water was then added and stirred at 5000 rpm for 5 minutes. The reaction mixture was held still until bubbles disappeared. The red pigment concentrate DBR006 prepared from Example 1 (15 weight parts) was then added and stirred for 15 minutes to obtain a photocurable inkjet ink.

The above ink was charged in a HP51626 ink cartridge and printed on a glass by a HP420 inkjet printer. The printed glass was baked at 90° C. for 30 minutes, then at 150° C. for 1 hour, and irradiated by UV light for 50 seconds.

The test results for UV curing reactivity and water fastness are shown in Table 1.

and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A photocurable pigment inkjet ink composition comprising:
   5 to 95 wt % of water;
   0.5 to 20 wt % of a pigment;
   0.05 to 15 wt % of a photoinitiator;
   1 to 70 wt % of a photocurable component; and
   0.0001 to 30 wt % of a reactive surfactant, wherein the reactive surfactant comprises a compound containing a terminal C=C double bond and is an emulsifier for emulsifying the photocurable component and the photoinitiator, and wherein the reactive surfactant comprises bis(polyoxyethylene polyphenyl ether) methacryl sulfate ammonium, or polyoxyethylene allyl nonylphenol sulfonate.

2. The photocurable pigment inkjet ink composition as claimed in claim 1, wherein the reactive surfactant comprise acrylic reactive surfactant containing a terminal C=C double bond or derivatives thereof.

3. The photocurable pigment inkjet ink composition as claimed in claim 1, wherein the reactive surfactant is non-ionic reactive surfactant and has a hydrophilic hydrophobic balance (HLB) value of 8 to 16.

4. The photocurable pigment inkjet ink composition as claimed in claim 3, wherein the reactive surfactant is non-ionic reactive surfactant and has a hydrophilic hydrophobic balance (HLB) value of 12 to 16.

5. The photocurable pigment inkjet ink composition as claimed in claim 1, wherein the reactive surfactant is present in an amount of 0.5 to 15 wt %.

TABLE 1

| Example | Dispersant | Emulsifier | UV-curing reactivity (film forming property) | Water fastness |
|---|---|---|---|---|
| Example 1 | Non-reactive | Reactive (bis(polyoxyethylene polyphenyl ether) methacryl sulfate ammonium) | >Grade 4 | >Grade 3 |
| Example 2 | Non-reactive | Reactive (Polyoxyethylene allyl nonylphenol sulfonate) | >Grade 4 | >Grade 3 |
| Example 3 | Reactive (bis(polyoxyethylene polyphenyl ether) methacryl sulfate ammonium) | Non-reactive | >Grade 4 | >Grade 3 |
| Comparative Example 1 | Non-reactive | Non-reactive | Grade 2 | Grade 1 |

As shown in Table 1, the photocurable jet ink of the present invention prepared by the reactive surfactant as either an emulsifier for the photocurable composition or a dispersant for pigment grinding has a better film-forming property and water fastness.

The foregoing description of the preferred embodiments of this invention has been presented for purposes of illustration and description. Obvious modifications or variations are possible in light of the above teaching. The embodiments chosen 6. The photocurable pigment inkjet ink composition as claimed in claim 1, wherein the composition has a surface tension of 20 to 65 mN/m.

7. The photocurable pigment inkjet ink composition as claimed in claim 6, wherein the composition has a surface tension of 20 to 40 mN/m.

8. The photocurable pigment inkjet ink composition as claimed in claim 1, wherein the reactive surfactant is a pigment dispersant for dispersing pigment particles.

9. The photocurable pigment inkjet ink composition as claimed in claim 1, wherein the reactive surfactant is an emulsifier for emulsifying the photocurable component.

10. A photocurable pigment inkjet ink composition comprising:

5 to 95 wt % of water;

0.5 to 20 wt % of a pigment;

1 to 70 wt % of a photocurable component; and 0.0001 to 30 wt % of a reactive surfactant, wherein the reactive surfactant comprises bis(polyoxyethylene polyphenyl ether) methacryl sulfate ammonium, or polyoxyethylene allyl nonylphenol sulfonate.

* * * * *